(12) United States Patent
Ozaki et al.

(10) Patent No.: US 11,326,665 B2
(45) Date of Patent: May 10, 2022

(54) TRANSMISSION BELT

(71) Applicant: Mitsuboshi Belting Ltd., Kobe (JP)

(72) Inventors: Toshiki Ozaki, Hyogo (JP); Yorifumi Hineno, Hyogo (JP); Shunsuke Isoe, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 90 days.

(21) Appl. No.: 16/303,402

(22) PCT Filed: May 23, 2017

(86) PCT No.: PCT/JP2017/019164
§ 371 (c)(1),
(2) Date: Nov. 20, 2018

(87) PCT Pub. No.: WO2017/204207
PCT Pub. Date: Nov. 30, 2017

(65) Prior Publication Data
US 2020/0200232 A1   Jun. 25, 2020

(30) Foreign Application Priority Data

May 23, 2016 (JP) .............................. JP2016-102618
May 15, 2017 (JP) ................................. 2017-096586

(51) Int. Cl.
*F16G 1/08* (2006.01)
*F16G 1/28* (2006.01)
(Continued)

(52) U.S. Cl.
CPC ................. *F16G 1/08* (2013.01); *F16G 1/28* (2013.01); *C08K 3/04* (2013.01); *C08K 3/06* (2013.01);
(Continued)

(58) Field of Classification Search
CPC ..................................... F16G 1/08; F16G 1/28
(Continued)

(56) References Cited

U.S. PATENT DOCUMENTS 5,653,655 A   8/1997   Onoe et al.
6,177,202 B1   1/2001   Takehara et al.
(Continued)

FOREIGN PATENT DOCUMENTS

CN   1264799 A   8/2000
CN   101133261 A   2/2008
(Continued)

OTHER PUBLICATIONS

Apr. 23, 2019—(JP) Notification of Reasons for Refusal—App 2017-096586.
(Continued)

*Primary Examiner* — Michael R Mansen
*Assistant Examiner* — Mark K Buse
(74) *Attorney, Agent, or Firm* — Banner & Witcoff, Ltd.

(57) ABSTRACT

The present invention relates to a transmission belt which is provided with: a rubber layer that is formed from a vulcanized product of a rubber composition which contains a rubber component containing an ethylene-α-olefin elastomer, a filler containing silica, a vulcanizing agent containing a sulfur-based vulcanizing agent, and a curable resin containing an amino resin; and a fiber member that is in contact with the rubber layer.

10 Claims, 1 Drawing Sheet

(51) Int. Cl.
*C08K 3/04* (2006.01)
*C08K 3/06* (2006.01)
*C08K 3/36* (2006.01)
*C08L 23/16* (2006.01)
*C08L 61/28* (2006.01)

(52) U.S. Cl.
CPC ............... *C08K 3/36* (2013.01); *C08L 23/16* (2013.01); *C08L 61/28* (2013.01)

(58) Field of Classification Search
USPC ........................................................ 474/260
See application file for complete search history.

(56) References Cited

U.S. PATENT DOCUMENTS

| | | | | |
|---|---|---|---|---|
| 6,361,462 | B1 | 3/2002 | Takada et al. | |
| 8,871,329 | B2* | 10/2014 | Yoshida | F16G 1/28 428/167 |
| 8,911,862 | B2* | 12/2014 | Giannantonio | B01J 20/18 428/336 |
| 8,911,863 | B2* | 12/2014 | Matsumoto | C09D 165/00 428/395 |
| 8,962,129 | B2* | 2/2015 | Tai | D06M 11/73 428/296.4 |
| 9,096,740 | B2* | 8/2015 | Baldovino | C08F 255/06 |
| 9,140,329 | B2* | 9/2015 | Yamada | F16G 1/12 |
| 2001/0034282 | A1* | 10/2001 | Hasaka | F16G 5/20 474/260 |
| 2003/0180516 | A1 | 9/2003 | Hasaka et al. | |
| 2008/0286529 | A1* | 11/2008 | Sueto | F16G 5/20 428/167 |
| 2009/0075770 | A1* | 3/2009 | Yoshida | F16G 5/06 474/238 |
| 2013/0217528 | A1* | 8/2013 | Matsumoto | D02G 3/44 474/263 |
| 2013/0237354 | A1* | 9/2013 | Shiriike | F16G 5/08 474/148 |
| 2013/0337956 | A1* | 12/2013 | Motozaki | F16G 1/08 474/205 |
| 2014/0080647 | A1* | 3/2014 | Sakamoto | C08L 63/00 474/205 |
| 2014/0287862 | A1 | 9/2014 | Yamada et al. | |
| 2015/0024892 | A1* | 1/2015 | Hineno | B29C 35/02 474/237 |
| 2015/0105198 | A1 | 4/2015 | Yamaji et al. | |
| 2015/0111677 | A1* | 4/2015 | Nishiyama | C08K 5/20 474/264 |
| 2015/0369335 | A1* | 12/2015 | Ishiguro | C08K 7/02 474/260 |
| 2016/0273616 | A1 | 9/2016 | Takehara et al. | |

FOREIGN PATENT DOCUMENTS

| | | |
|---|---|---|
| CN | 103403389 A | 11/2013 |
| CN | 104428561 A | 3/2015 |
| CN | 105102856 A | 11/2015 |
| CN | 105358869 A | 2/2016 |
| EP | 2000702 A2 | 12/2008 |
| JP | H08-004840 A | 1/1996 |
| JP | 2002-039275 A | 2/2002 |
| JP | 2008-261489 A | 10/2008 |
| JP | 2010-169215 A | 8/2010 |
| JP | 2013-108564 A | 6/2013 |
| KR | 10-2009-0009078 A | 1/2009 |
| WO | 2007-110974 A1 | 10/2007 |

OTHER PUBLICATIONS

Jun. 25, 2019—(JP) Notification of Reasons for Refusal—App 2017-096586.
Feb. 18, 2020—(KR) Office Action—App 10-2018-7033267.
Aug. 13, 2019—(JP) Decision of Refusal—App 2017-096586.
Aug. 1, 2017—International Search Report—Intl App PCT/JP2017/019164.
Oct. 21, 2019—(CN) Notification of First Office Action—App 201780027468.1.
Oct. 31, 2019—(EP) Extended Search Report—App 17802793.4.
Sep. 3, 2020—(CN) Decision of Rejection—App 201780027468.1 with English Translation.
May 18, 2020—(CN) Notification of Second Office Action—App 201780027468.1.
Mar. 21, 2022—(EP) Office Action—App 17802793.4.

\* cited by examiner

[FIG. 1]
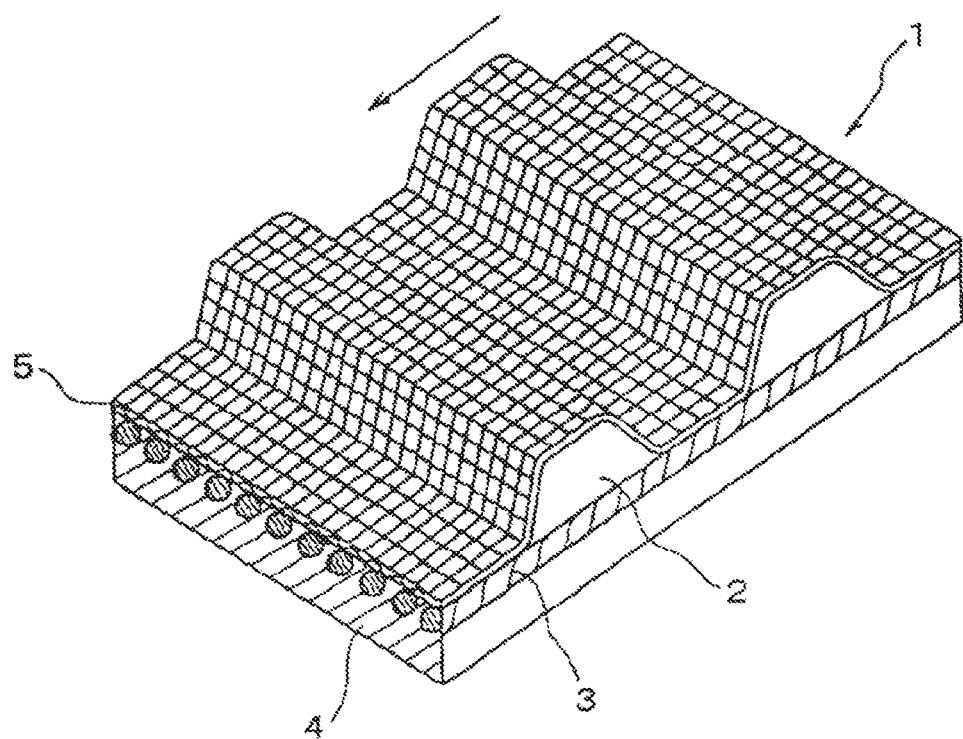
[FIG. 2]
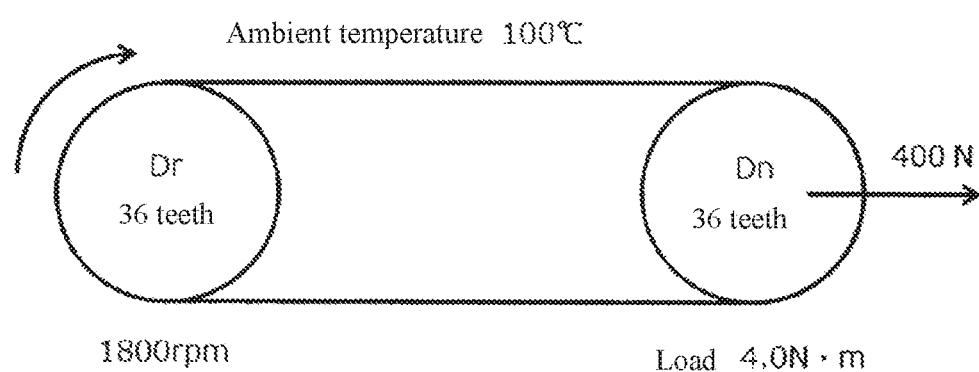

TRANSMISSION BELT

CROSS REFERENCE TO RELATED APPLICATIONS

This is a U.S. National Phase Application under 35 U.S.C. § 371 of International Application No. PCT/JP2017/019164, filed May 23, 2017, which claims priority to Japanese Application Nos. 2016-102618 filed May 23, 2016 and 2017-096586 filed May 15, 2017, which was published Under PCT Article 21(2), the entire contents of which are incorporated herein by reference.

TECHNICAL FIELD

The present invention relates to a power transmission belt such as a toothed belt having a power transmission surface (meshing power transmission surface) covered with a fiber material (tooth fabric).

BACKGROUND ART

A fiber-reinforced material formed of rubber and fibers has been used in industrial products such as tires, belts, hoses, and rubber covering fabrics. As rubber commonly used for a power transmission belt among these industrial products, ethylene-α-olefin elastomers such as ethylene-propylene-diene copolymer rubber (EPDM) have been known. Since the ethylene-α-olefin elastomers have no unsaturated bond in a main chain and are nonpolar, they have excellent heat resistance and cold resistance; on the other hand, it is very difficult to adhere them with fibers. For example, a rubber toothed belt containing EPDM as a base material is insufficient in adhesive force between the EPDM and a cover fabric or cord, and particularly when traveling at a high temperature, the rubber and the cover fabric at a tooth root part are repeatedly deformed together with thermal deterioration. Therefore, there has been a problem in that peeling occurs between the 5 rubber and the cord to cause tooth chipping or peeling occurs at an interface between the cover fabric and the rubber, leading to a significant deterioration in durability of the toothed belt.

Regarding the power transmission belt which rubber component is EPDM, as a method for enhancing adhesive force under a high temperature between rubber and a cord, PTL 1 discloses a power transmission belt containing the cord buried in an adhesion rubber layer along a longitudinal direction of the belt, a compression rubber layer disposed on the power transmission surface side adjacent to the adhesion rubber layer, and a tension rubber layer disposed on the back surface side, in which the adhesion rubber layer is formed of an organic peroxide-crosslinked product of a rubber composition obtained by blending from 20 to 70 parts by mass of silica to 100 parts by mass of rubber component containing an ethylene-α-olefin elastomer. This document discloses that the adhesion rubber layer preferably further contains a resorcinol-formalin resin (resorcinol resin) or a melamine polymer from the viewpoint that the adhesiveness between the cord and the belt main body can be maintained at a high level even at high temperature. In addition, a V-ribbed belt and cogged V-belt are disclosed as the power transmission belt.

As disclosed in this document, in a frictional power transmission belt such as a V-ribbed belt and cogged V belt, rubbers of different compositions are often laminated in the adhesion rubber layer and the compression rubber layer. It is considered that a reason for this is because it is advantageous to incorporate more carbon black in order to enhance mechanical properties of the rubber, such as abrasion resistance and modulus, but on the other hand, the adhesive force tends to be decreased as the amount of carbon black is increased. Therefore, in the frictional power transmission belt, it is common to dispose rubber blended specifically for adhesiveness around the fiber material and to form the belt main body with rubber blended with enhanced mechanical properties. Also in PTL 1, a filler (reinforcing agent) blended in the adhesion rubber layer is only silica, which is considered to be a result of avoiding the addition of carbon black which leads to deterioration in the adhesiveness. Therefore, in the frictional power transmission belt, the mechanical properties of the adhesion rubber layer itself are not sufficient, and there is also a structural defect that the belt structure becomes complicated due to the presence of the adhesion rubber layer.

On the other hand, in the case of a toothed belt, there are few cases of using the adhesion rubber layer, and the rubber of the belt main body comes into direct contact with the cord and cover fabric. Therefore, in addition to the abrasion resistance and high modulus required for power transmission, it is required for the rubber layer of the toothed belt to be compatible with the adhesive force with the cord and cover fabric. Therefore, it is not possible to adopt a composition containing only silica as a filler as disclosed in PTL 1, but a composition containing carbon black and having high adhesive force with fiber members is required for the rubber layer of the toothed belt.

PTL 2 discloses a power transmission belt provided with a rubber portion formed by vulcanizing a rubber composition containing rubber, resorcinol and a melamine compound. It is also disclosed that an organic peroxide vulcanizing agent is preferable as a vulcanizing agent (or a crosslinking agent) to be blended in the rubber composition, and it is also used in Examples. As the rubber, hydrogenated nitrile rubber and EPDM are used in Examples. Furthermore, in Examples, 40 parts by mass of silica, 5 parts by mass of carbon black, 1.7 parts by mass or 3.4 parts by mass of melamine compound are blended with respect to 100 parts by mass of EPDM in the rubber composition containing EPDM.

However, in this toothed belt, an organic peroxide is used as a crosslinking agent. Since the organic peroxide attacks, hardens, and deteriorates the resorcinol resin, which is an adhesion treatment agent for the cover fabric, it is difficult to enhance the adhesive force with the cover fabric. In the toothed belt, due to a stress concentrated on the tooth root part, tearing resistance of the rubber is also important. However, since the crosslinking is progressed with the organic peroxide, the tearing resistance is not sufficient. In addition, probably due to the low ratio of the melamine compound to silica, the adhesive force between the rubber portion and the cord is not sufficient, and probably due to a low ratio of carbon black, the mechanical properties such as the abrasion resistance and modulus are also not sufficient.

CITATION LIST

Patent Literature

[PTL 1] JP-A-2008-261489
[PTL 2] JP-A-2013-108564

SUMMARY OF INVENTION

Technical Problem

An object of the present invention is to provide a power transmission belt even having a rubber layer containing an ethylene-α-olefin elastomer and a fiber member in contact with the rubber layer provided, the power transmission belt can suppress peeling between the rubber layer and the fiber member and has high mechanical properties such abrasion resistance and modulus.

Another object of the present invention is to provide a power transmission belt which can improve durability even when being used as a toothed belt at high temperature.

Still another object of the present invention is to provide a power transmission belt which can suppress peeling even with the fiber member formed of any fiber of an inorganic fiber or an organic fiber.

Solution to Problem

As a result of intensive studies to achieve the above objects, the present inventors have found that when a rubber layer of a power transmission belt is formed by combining a rubber component containing an ethylene-α-olefin elastomer, a filler containing silica, a vulcanizing agent containing a sulfur vulcanizing agent, and a curable resin containing an amino resin, even in the case where the rubber layer containing an ethylene-α-olefin elastomer and a fiber member in contact with the rubber layer are provided, peeling between the rubber layer and the fiber member can be suppressed and the mechanical properties such abrasion resistance and modulus can be improved. With this the present invention has been completed.

That is, the power transmission belt of the present invention is a power transmission belt provided with a rubber layer and a fiber member being in contact with the rubber layer, in which the rubber layer is formed of a vulcanizate of a rubber composition containing a rubber component containing an ethylene-α-olefin elastomer, a filler containing silica, a vulcanizing agent containing a sulfur vulcanizing agent, and a curable resin containing an amino resin. The amino resin may contain a melamine resin. The filler may further contain carbon black. The ratio of the amino resin may be from about 10 to 50 parts by mass with respect to 100 parts by mass of silica. The ratio of the silica may be from about 10 to 150 parts by mass with respect to 100 parts by mass of carbon black. The rubber layer may contain from 5 to 30 parts by mass of silica and from 10 to 100 parts by mass of carbon black with respect to 100 parts by mass of the rubber component. The sulfur vulcanizing agent may be sulfur. The curable resin may not contain a resorcinol resin. The vulcanizing agent may not contain an organic peroxide. The power transmission belt of the present invention may be a toothed belt which contains a belt main body including a plurality of tooth portions arranged at predetermined intervals along a belt longitudinal direction and a back portion in which a tension member is buried, and a cover fabric covering the surfaces of the plurality of tooth portions. The belt main body (tooth portion and back portion) may be the rubber layer. The tension member may contain an inorganic fiber.

Advantageous Effects of Invention

In the present invention, a rubber layer of the power transmission belt is formed by combining a rubber component containing an ethylene-α-olefin elastomer, a filler containing silica, a vulcanizing agent containing a sulfur vulcanizing agent, and a curable resin containing an amino resin. Therefore, even in the case where the rubber layer containing an ethylene-α-olefin elastomer and a fiber member in contact with the rubber layer are provided peeling between the rubber layer and the fiber member can be suppressed, and the mechanical properties such abrasion resistance and modulus can be improved. Therefore, even in the case of being used as a toothed belt at high temperature, durability can be improved. Furthermore, in the power transmission belt of the present invention, peeling can be suppressed even with the fiber member formed of any fiber of an inorganic fiber or an organic fiber.

BRIEF DESCRIPTION OF DRAWINGS

FIG. 1 is a cross-sectional perspective view illustrating an example of a power transmission belt (toothed belt) of the present invention.

FIG. 2 is a schematic view for explaining a durability travelling test of the power transmission belt in Examples.

DESCRIPTION OF EMBODIMENTS

The power transmission belt of the present invention is provided with a rubber layer and a fiber member being in contact with the rubber layer, and may be various frictional power transmission belts or various engaging power transmission belts (toothed belts). Among these power transmission belts, it is particularly useful for a toothed belt which is highly required to satisfy both adhesiveness between the rubber layer and the fiber member and mechanical properties such as abrasion resistance and modulus.

FIG. 1 is a cross-sectional perspective view illustrating an example of a toothed belt according to the present invention. A toothed belt 1 is provided with a plurality of tooth portions 2 formed at predetermined intervals along the longitudinal direction of the belt (arrow in the figure) and a back portion 4 in which a plurality of tension members 3 are buries along the longitudinal direction of the belt, and a tooth fabric (cover fabric) 5 is adhered (covered or laminated) to the surface of the tooth portion 2. The tooth portion 2 is formed to have a trapezoidal longitudinal cross-sectional shape. In the toothed belt 1, the tooth portions 2 and the back portion 4 constitute a belt main body, and the belt main body is formed of the rubber layer. The tension member 3 and the cover fabric 5 constitute the fiber member.

The shape of the toothed belt is not limited to the structure illustrated in FIG. 1, but only has to have a plurality of tooth portions or convex portions which are formed on at least one surface of the belt at a predetermined interval in the longitudinal direction of the belt and are engageable with a toothed pulley. The cross-sectional shape (cross-sectional shape in the longitudinal direction or the width direction of the belt) of the tooth portion or convex portion is not limited to trapezoid, but may be, for example, a semicircular shape, a semiellipse shape and a polygonal shape (e.g., a triangle, a square (a rectangle, etc.), etc.), depending on the form of the toothed pulley or the like. In addition, the interval between the tooth portions or convex portions adjacent to each other in the longitudinal direction may be, for example, from about 1 to 10 mm, and preferably from about 2 to 8 mm, depending on the form of the toothed pulley or the like.

In the following description, the tooth portion and the convex portion are treated as the same meaning, and the respective elements of toothed belt of the structure illustrated in FIG. 1 will be described.

[Tooth Portion 2 and Back Portion 4]

The belt main body (tooth portion 2 and back portion 4) is formed of a vulcanizate of a rubber composition, and the rubber composition contains a rubber component, a filler, a vulcanizing agent, and a curable resin (and an additive contained as necessary).

(Rubber Component)

The rubber component contains an ethylene-α-olefin elastomer. Examples of the ethylene-α-olefin elastomer include ethylene-α-olefin copolymer rubbers and ethylene-α-olefin-diene terpolymer rubbers. Examples of α-olefin include chain α-$C_{3-12}$ olefins such as propylene, butene, pentene, methyl pentene, hexene, and octene. Among these α-olefins, α-$C_{3-4}$ olefins such as propylene (particularly propylene) are preferable.

Examples of the diene monomer generally include non-conjugated diene monomers such as dicyclopentadiene, methylene norbornene, ethylidene norbornene, 1,4-hexadiene, and cyclooctadiene. Among these diene monomers, ethylidene norbornene and 1,4-hexadiene (particularly, ethylidene norbornene) are preferable.

Typical examples of the ethylene-α-olefin elastomer include ethylene-propylene copolymers (EPM), ethylene-propylene-diene terpolymers (EPDM, etc), ethylene-butene copolymers (EBM), and ethylene-octene copolymers (EOM). These ethylene-α-olefin elastomers can be used alone or in combination of two or more kinds thereof.

Among them, ethylene-α-olefin-diene terpolymer rubbers (particularly, ethylene-α-$C_{3-4}$ olefin-diene terpolymer rubbers such as EPDM) are preferable from the viewpoint of being excellent in heat resistance and cold resistance.

As long as the effect of the present invention is not impaired, the rubber component may contain, in addition to the ethylene-α-olefin elastomer, another rubber component such as a diene rubber [hydrogenated product of diene rubber such as natural rubber, isoprene rubber, butadiene rubber, chloroprene rubber, styrene-butadiene rubber (SBR), vinyl pyridine-styrene-butadiene copolymer rubber, acrylonitrile-butadiene rubber (nitrile rubber); hydrogenated nitrile rubber (including a mixed polymer of hydrogenated nitrile rubber and metal salt of unsaturated carboxylic acid), etc.], an olefinic rubber (polyoctenylene rubber, ethylene-vinyl acetate copolymer rubber, chlorosulfonated polyethylene rubber, alkylated chlorosulfonated polyethylene rubber, etc.), an epichlorohydrin rubber, an acrylic rubber, a silicone rubber, an urethane rubber, and a fluororubber.

The ratio of the ethylene-α-olefin elastomer is 50% by mass or more, preferably 80% by mass or more, and more preferably 90% by mass or more (particularly, 95% by mass or more) with respect to the entire rubber components, and may be 100% by mass (rubber component is formed of only the ethylene-α-olefin elastomer). In the case where the ratio of the ethylene-α-olefin elastomer is excessively less, there is a concern in that the heat resistance and cold resistance of the power transmission belt are deteriorated.

(Filler)

In the present invention, in order to improve mechanical properties of the power transmission belt to enhance durability, the filler contains silica. The silica is a fine, bulky white powder formed of silicic acid and/or silicate, has a plurality of silanol groups on its surface, and thus can be chemically bonded to the rubber component.

The silica includes dry silica, wet silica, surface treated silica, and the like. Also, in accordance with a classification by manufacturing method, silica can be classified into, for example, dry method white carbon, wet method white carbon, colloidal silica, precipitated silica, and the like. These silicas can be used alone or in combination of two or more kinds thereof. Among them, from the viewpoint of a number of the surface silanol groups and a strong chemical bonding force with the rubber component, a wet method white carbon containing hydrated silicic acid as a main component is preferable.

An average particle diameter of the silica is, for example, from 1 to 1,000 nm, preferably from 3 to 300 nm, and more preferably from 5 to 100 nm (particularly, from 10 to 50 nm). In the case where the particle diameter of the silica is excessively large, the mechanical properties of the rubber layer (belt main body) may be deteriorated; whereas in the case of excessively small, it may be difficult to disperse uniformly.

In addition, the silica may be either non-porous or porous and may have a nitrogen adsorption specific surface area by a BET method being, for example, from 50 to 400 $m^2/g$, preferably from 70 to 350 $m^2/g$, and more preferably from 100 to 300 $m^2/g$ (particularly, from 150 to 250 $m^2/g$). In the case where the specific surface area is excessively large, it may be difficult to disperse uniformly; whereas in the case where the specific surface area is excessively small, the mechanical properties of the rubber layer may be deteriorated.

The ratio of silica can be selected from the range of from 1 to 100 parts by mass (e.g., from 5 to 30 parts by mass) with respect to 100 parts by mass of the rubber component, and may be, for example, from 3 to 50 parts by mass (e.g., 5 to 50 parts by mass), preferably from 5 to 40 parts by mass (e.g., from 10 to 40 parts by mass), and more preferably from 8 to 20 parts by mass (particularly, from 10 to 15 parts by mass). In addition, the ratio of silica can be selected from the range of from 1 to 300 parts by mass with respect to 100 parts by mass of the carbon black described below, and may be, for example, from 5 to 200 parts by mass (e.g., from 10 to 150 parts by mass), preferably from 10 to 100 parts by mass (e.g., from 12 to 50 parts by mass), and more preferably from 13 to 30 parts by mass (particularly, from 15 to 20 parts by mass). In the case where the ratio of silica is excessively small, adhesiveness and reinforce ability may be deteriorated; whereas, in the case of excessively large, it may be difficult to disperse uniformly in the rubber layer, and adhesiveness with the fiber member (particularly, cover fabric) may be deteriorated.

In the present invention, in addition to silica, carbon black is preferably included as a filler. The carbon black has a function of remarkably improving fatigue fracture resistance and abrasion resistance of a rubber layer. Combination of silica and carbon black can achieve both mechanical properties such as modulus and the adhesiveness with respect to a fiber member, and therefore, can improve durability of the power transmission belt.

The average particle diameter of carbon black is, for example, from 5 to 200 nm, preferably from 10 to 150 nm, and more preferably from 15 to 100 nm. From the viewpoint of high reinforcement effect, carbon black having a small particle size may be used, and the average particle diameter thereof is, for example, from 5 to 38 nm, preferably from 10 to 35 nm, and more preferably from 15 to 30 nm. Examples of the carbon black having a small particle size include SAF, ISAF-HM, ISAF-LM, HAF-LS, HAF, and HAF-HS. These carbon blacks can be used alone or in combination.

The ratio of carbon black can be selected from the range of from 10 to 150 parts by mass (e.g., from 10 to 100 parts by mass) with respect to 100 parts by mass of the rubber component, and may be, for example, from 20 to 120 parts by mass, preferably from 30 to 100 parts by mass (e.g., from 35 to 80 parts by mass), and more preferably from 40 to 70 parts by mass (particularly, from 50 to 60 parts by mass). In the case where the ratio of carbon black is excessively small, the reinforce ability and abrasion resistance may not be sufficiently exerted; whereas in the case of excessively large, the adhesiveness may be deteriorated or it is difficult to disperse uniformly.

The filler may further contain a conventional filler. Examples of the conventional filler include clay, calcium carbonate, talc, and mica. These conventional fillers can be used alone or in combination of two or more kinds thereof.

The total ratio of silica and carbon black (in the case of only silica, the ratio of silica) may be 50% by mass or more in the entire filler, preferably 60% by mass or more, and more preferably 70% by mass more (particularly, 80% by mass or more), and may be 90% by mass or more (particularly, 100% by mass). In the case where the ratio of silica and carbon black is excessively small, the mechanical properties of the rubber layer may be deteriorated.

The ratio (total ratio) of the filler is, for example, from 30 to 100 parts by mass with respect to 100 parts by mass of the rubber component, preferably from 50 to 90 parts by mass, and more preferably from 60 to 80 parts by mass. In the case where the ratio of the filler is excessively small, the mechanical properties such as abrasion resistance and modulus may be deteriorated; whereas, in the case of excessively large, the adhesiveness with the fiber member may be deteriorated.

(Vulcanizing Agent)

A vulcanizing agent (or crosslinking agent) contains a sulfur vulcanizing agent from the viewpoint of improving adhesiveness with the fiber member (particularly, a tension member containing an inorganic fiber). Examples of the sulfur vulcanizing agent include powdered sulfur, precipitated sulfur, colloidal sulfur, insoluble sulfur, highly dispersible sulfur, and sulfur chloride (such as sulfur monochloride or sulfur dichloride). These sulfur vulcanizing agents can be used alone or in combination of two or more kinds thereof. Among these sulfur vulcanizing agents, sulfur such as powdered sulfur is preferable.

The vulcanizing agent may further include another vulcanizing agent as long as the effect of the present invention is not impaired. Examples of other vulcanizing agents include organic peroxides (diacyl peroxide, peroxyester, dialkyl peroxide, etc.).

The ratio of the sulfur vulcanizing agent (particularly, sulfur) is preferably 50% by mass or more, more preferably 80% by mass or more, and still more preferably 90% by mass or more (particularly, 95% by mass or more) in the entire vulcanizing agent (or crosslinking agent), and may be 100% by mass (only the sulfur vulcanizing agent). In the case where the ratio of the sulfur vulcanizing agent is excessively small, the adhesiveness with the fiber member (in particular, the tension member) may be deteriorated. In particular, in the present invention, it is preferable that the vulcanizing agent contains substantially no organic peroxide, and it is particularly preferable that the vulcanizing agent does not contain any organic peroxide at all, from the viewpoint of improving the adhesiveness with the fiber member (in particular, the tension member). In the present specification and claims, the phrase "contain substantially no organic peroxide" means that it is not contained except for those contaminated as unavoidable impurities, and the upper limit of the content is, for example, about 0.1% by mass in the entire vulcanizing agent (or crosslinking agent).

The ratio of the vulcanizing agent (particularly, the sulfur vulcanizing agent) can be selected from the range of from 0.1 to 20 parts by mass with respect to 100 parts by mass of the rubber component and may be, for example, from 0.2 to 10 parts by mass, preferably from 0.3 to 5 parts by mass, and more preferably from 0.5 to 3 parts by mass (particularly, from 0.8 to 2 parts by mass). In the case where the ratio of the vulcanizing agent is excessively small, the mechanical properties such as abrasion resistance of the rubber layer may be deteriorated; whereas, in the case of excessively large, flexibility may be deteriorated.

(Curable Resin)

The curable resin (adhesiveness improver or binder resin) contains an amino resin from the viewpoint of improving the adhesiveness with the fiber member.

Examples of the amino resin include conventional amino resins such as a melamine resin, a urea resin (urea resin), a guanamine resin, and an aniline resin. These amino resins can be used alone or in combination of two or more kinds thereof. Among these amino resins, a melamine resin is preferable from the viewpoint of improving the adhesiveness with the fiber member (in particular, a tension member containing an inorganic fiber under high temperature).

As the melamine resin, a conventional melamine resin can be used, or a reaction product (e.g., an initial condensate or a prepolymer) obtained by reacting melamine with formaldehyde under neutral or alkaline conditions can be also used. Furthermore, as long as the effect of the present invention is not impaired, other compounds having an amino group, such as urea, guanamine (e.g., formoguanamine, acetoguanamine, benzoguanamine, etc.), and aniline, may be used in combination with melamine. The ratio of the other compounds having an amino group may be 0.3 mol or less (particularly, 0.1 mol or less) with respect to 1 mol of melamine.

As the formaldehyde, a condensate of formaldehyde (e.g., trioxane, paraformaldehyde, etc.) may be used, or an aqueous solution of formaldehyde (formalin, etc.) may be used.

The ratio (use ratio) of melamine and formaldehyde is, for example, the former/latter (molar ratio)=from 1/1 to 1/10, preferably from 1/3 to 1/8, and more preferably from 1/5 to 1/7.

As the melamine resin, for example, mono- to hexamethylolmelamines such as trimethylolmelamine and hexamethylolmelamine are widely used, and from the viewpoint of heat resistance, adhesiveness and the like, tetra- to hexamethylolmelamines (particularly hexamethylolmelamine) are preferable. The melamine resin (particularly, tetra- to hexamethylol melamines) may be etherified with an alkyl group (e.g., a $C_{1-4}$ alkyl group such as methyl, ethyl, n-butyl, isobutyl, etc.) from the viewpoint of handling and the like. As the etherified alkyl ether melamine resin, for example, mono- to hexa $C_{1-4}$ alkoxymethyl melamines and the like are widely used, and a hexa $C_{1-4}$ alkoxymethyl melamine such as hexamethoxymethyl melamine, hexa-n-butoxymethyl melamine, and hexaisobutoxymethyl melamine is preferably used.

The ratio of the melamine resin is preferably 50% by mass or more, more preferably 80% by mass or more, and still more preferably 90% by mass or more (particularly, 95% by mass or more) in the entire amino resin, and may be 100% by mass (only the melamine resin).

The ratio of the amino resin (particularly, the melamine resin) can be selected from the range of from 1 to 100 parts by mass with respect to 100 parts by mass of silica, and may be, for example, from 5 to 80 parts by mass, preferably from 8 to 60 parts by mass, and more preferably from 10 to 50 parts by mass (particularly, from 20 to 50 parts by mass). In the case where the ratio of the amino resin is excessively small, the adhesiveness with the fiber member (in particular, the tension member) may be deteriorated; whereas in the case of excessively large, the adhesiveness with the fiber member and bending fatigue resistance may be deteriorated.

The curable resin may further include another curable resin (resorcinol resin, etc.) as long as the effect of the present invention is not impaired. The resorcinol resin (resorcinol formalin resin) is a condensate of a phenol including resorcinol and formaldehyde, and may be a mixture with latex.

The ratio of the amino resin (particularly, the melamine resin) is preferably 50% by mass or more, more preferably 80% by mass or more, and still more preferably 90% by mass or more (particularly, 95% by mass or more) in the entire curable resin, and may be 100% by mass (only the amino resin). In the case where the ratio of the amino resin is excessively small, the heat resistance and the adhesiveness with the fiber member (in particular, the tension member) may be deteriorated. In particular, in the present invention, it is preferable that the curable resin contains substantially no resorcinol resin, and particularly preferably does not contain resorcinol resin at all, from the viewpoint of improving the adhesiveness with the fiber member (in particular, the tension member). In the present specification and claims, the phrase "contain substantially no resorcinol resin" means that it is not contained except for those contaminated as unavoidable impurities, and the upper limit of the content is, for example, about 0.1% by mass in the entire curable resin.

The ratio of the curable resin (particularly, the amino resin) can be selected from the range of from 0.1 to 30 parts by mass with respect to 100 parts by mass of the rubber component, and may be, for example, from 0.3 to 20 parts by mass, preferably from 0.5 to 10 parts by mass, and more preferably from 1 to 8 parts by mass (particularly, from 2 to 5 parts by mass), from the viewpoint of the adhesiveness.

(Other Additives)

The rubber composition forming the belt main body (tooth portion 2 and back portion 4) may contain various additives (or compounding agents) which are commonly used, if necessary.

Examples of the additives include vulcanization aids (arene bismaleimides such as N,N'-m-phenylenedimaleimide, aromatic bismaleimides, etc.), vulcanization accelerators [thiuram accelerators such as tetramethylthiuram-monosulfide (TMTM), tetramethylthiuram-disulfide (TMTD), tetraethylthiuram-disulfide (TETD), tetrabutylthiuram-disulfide (TBTD), dipentamethylenethiuram-tetrasulfide (DPTT), and N,N'-dimethyl-N,N'-diphenylthiuram-disulfide; thiazole accelerators such as 2-mercaptobenzothiazole, zinc salt of 2-mercaptobenzothiazole, 2-mercaptothiazoline, dibenzothiazyl disulfide, and 2-(4'-morpholinodithio) benzothiazole; sulfenamide accelerators such as N-cyclohexyl-2-benzothiazyl sulfenamide (CBS), N,N'-dicyclohexyl-2-benzothiazylsulfenamide; guanidines such as diphenylguanidine and di-o-tolylguanidine; urea or thiourea accelerators such as ethylene thiourea; dithiocarbamates; xanthogenates, etc.], vulcanization retardants, metal oxides (zinc oxide, magnesium oxide, calcium oxide, barium oxide, iron oxide, copper oxide, titanium oxide, aluminum oxide, etc.), short fibers [short fibers such as cellulosic fibers such as cotton and rayon, polyester fibers (pet fibers, etc.), polyamide fibers (aliphatic polyamide fibers such as polyamide 6, aramid fibers, etc.)], plasticizers, softeners (oils such as paraffin oil and naphthenic oil, etc.), processing agents or processing aids (stearic acid, stearic acid metal salts, wax, paraffin, etc.), anti-aging agents (aromatic amine anti-aging agents, benzimidazole anti-aging agent, etc.), coloring agents, tackifiers, coupling agents (silane coupling agents, etc.), stabilizers (antioxidants, ultraviolet absorbers, thermal stabilizers, etc.), lubricants, flame retardants, and antistatic agents. These additives can be used alone or in combination of two or more kinds thereof.

The total ratio of the additives is, for example, from 1 to 100 parts by mass, preferably from 5 to 50 parts by mass, and more preferably from 10 to 20 parts by mass with respect to 100 parts by mass of the rubber component. Specifically, with respect to 100 parts by mass of the rubber component, for example, the ratio of the vulcanization accelerator is from 0.1 to 10 parts by mass (particularly, from 0.5 to 5 parts by mass), the ratio of the metal oxide is from 1 to 20 parts by mass (particularly, from 3 to 10 parts by mass), the ratio of the softener is from 1 to 20 parts by mass (particularly, from 3 to 10 parts by mass), the ratio of the processing agent (aid) is from 0.1 to 5 parts by mass (particularly, from 0.5 to 3 parts by mass), and the ratio of the anti-aging agent is from 1 to 20 parts by mass (particularly, from 3 to 10 parts by mass).

The rubber compositions forming the tooth portion 2 and the back portion 4 may be different rubber compositions from each other or may be the same rubber composition as each other as long as the adhesiveness between the tooth portion 2 and back portion 4 is not impaired. In general, the tooth portion 2 and the back portion 4 contain rubbers of the same series (e.g., rubbers belonging to ethylene-α-olefin elastomer and being different in kinds) or rubber component of the same kind (e.g., ethylene-α-olefin elastomer of the same kind) in many cases.

[Tension Member 3]

The tension member 3 is buried in the belt main body along the longitudinal direction of the belt in order to improve traveling stability, belt strength and the like. Usually, a plurality of cords (twisted cords) extending along the longitudinal direction of the belt are buried in the belt main body.

The cord may be formed of the twisted cord obtained by twisting a plurality of strands or multifilament yarns. Among these, the twisted cord of the strand is preferable, and one strand may be formed by bundling filaments (long fibers). An average cord diameter of the cord (fiber diameter of twisted cord) is, for example, from about 0.2 to 0.6 mm There are no particular limitation in the diameter of the filament forming the twisted cord, the number of filaments to be bundled, the number of strands, and the twist configuration of a twisting mode.

The fiber forming the cord is not particularly limited, and examples thereof include synthetic fibers such as polyester fibers (polyalkylene arylate fibers and polyparaphenylene naphthalate fibers), polybenzoxazole fibers, acrylic fibers, and polyamide fibers (aliphatic polyamide fibers, aramid fibers, etc.), and inorganic fibers such as glass fibers, carbon fibers, and metal fibers (steel fibers). These fibers can be used alone or in combination of two or more kinds thereof. From the viewpoint of low elongation and high strength, for example, a synthetic fiber such as polyester fiber and polyamide fiber, an inorganic fiber such as glass fiber and carbon fiber, and the like are generally used as the fiber forming the cord. The composition of the glass fiber is not particularly limited, and may be E glass, S glass (high strength glass), C glass, or the like. Among these, high strength glass fiber and carbon fiber are preferable from the viewpoint of high strength and low elongation, and from the viewpoint of economy, high strength glass fiber is particularly preferable.

The plurality of cords may be buried at a predetermined interval (or pitch) (or at equal intervals) in the width direction of the belt. The interval (spinning pitch) between adjacent cords may be, for example, from about 0.5 to 2 mm and preferably from about 0.8 to 1.5 mm, depending on the diameter of the cord.

An adhesion treatment may be performed on the cord in order to enhance the adhesiveness with the belt main body. The method of the adhesion treatment is, for example, a method in which a twist cord is immersed in a resorcin-formalin-latex treatment liquid (RFL treatment liquid) and then heated and dried to form a uniform adhesive layer on the surface of the twisted cord. The RFL treatment liquid may be a mixture obtained by mixing an initial condensate of resorcin and formalin in a latex. Examples of the latex include chloroprene rubber, styrene-butadiene-vinylpyridine terpolymers (VP latex), nitrile rubber, and hydrogenated nitrile rubber. Furthermore, the method of the adhesion treatment may be a method in which pretreating with an epoxy compound or an isocyanate compound is performed and then a treatment with the RFL treatment liquid is performed.

[Cover Fabric 5]

A cover fabric (tooth fabric) 5 is coated or laminated on the tooth portion 2 of the toothed belt 1, which is a pulley contact surface, and the cover fabric 5 is integrated with the tooth portion 2.

The cover fabric is preferably a woven fabric. The woven construction (woven structure) of the cover fabric is not particularly limited, and has any structure as long as it is a woven fabric in which warp yarns and weft yarns are regularly crossed and woven longitudinally and laterally. Examples thereof include twill weave (oblique textile), satin weave (satin weave, satin), and plain weave. Among these, twill weave and satin weave structures are preferable from the viewpoint that the number of contact points of the fibers (or yarns) is small and it is easy to impregnate the treatment liquid.

The forms of the warp yarns and weft yarns are not particularly limited, and may be any of multifilament yarns in which filaments (long fibers) are aligned or twisted, a monofilament yarn that is one long fiber, and a spun yarn in which short fibers are twisted. In the case where the warp yarns and weft yarns are the multifilament yarns or spun yarns, those may be combined-twisted yarns or combined-spun yarns using a plurality of kinds of fibers. Among these, the weft yarns preferably include elastic yarns having stretchability. As the elastic yarns, for example, an elastic yarn whose material itself is stretchable, such as a spandex made of polyurethane, or a processed yarn obtained by subjecting a fiber to expansion and contraction processing (e.g., woolie processing, crimping processing, etc.), or the like can be used. On the other hand, from the viewpoint of weaving properties, elastic yarns are not usually used for warp yarns. In addition, as a cover fabric, it is preferable to arrange the warp yarns of the woven fabric to extend in the belt width direction and the wefts yarns to extend in the belt longitudinal direction from the viewpoint of securing stretchability of the cover fabric in the belt longitudinal direction.

The average diameter of the fibers (or yarns) constituting the cover fabric may be, for example, from about 5 to 100 μm, and preferably from about 10 to 50 μm. The average fiber diameter (thickness) of the yarn (twisted yarn) formed of fibers may be, for example, from about 100 to 1,000 dtex and preferably from about 300 to 700 dtex in the case of the weft yarns, and from 50 to 500 dtex and preferably from about 100 to 300 dtex in the case of the warp yarns. The density of the weft yarns (number/cm) may be, for example, from about 5 to 50 and preferably from about 10 to 30, and the density of the warp yarns (number/cm) may be, for example, from about 10 to 300 and preferably from about 20 to 100.

Examples of the fiber forming the weft yarns and warp yarns of the cover fabric include cellulose fibers [cellulose fibers (cellulose fibers derived from plants such as cotton, from animal and from bacteria), regenerated cellulose fibers such as rayon, cellulose ester fibers, etc.], polyolefin fibers, vinyl alcohol fibers, polyamide fibers (aliphatic polyamide fibers such as polyamide 6 fiber, polyamide 66 fiber and polyamide 46 fiber, aromatic polyamide fibers such as aramid fiber), polyester fibers [e.g., $C_{2-4}$ alkylene $C_{6-14}$ arylate fibers such as polyethylene terephthalate (PET) fiber, polypropylene terephthalate (PPT) fiber, polytrimethylene terephthalate (PTT) fiber, and polyethylene naphthalate (PEN) fiber; and wholly aromatic polyester fibers such as polyarylate fibers and liquid crystal polyester fibers], polyphenylene ether fibers, polyether ether ketone fibers, polyether sulfone fibers, polybenzoxazole fibers (polyparaphenylene benzobisoxazole (PBO) fiber, etc.), polyurethane fibers, and inorganic fibers such as carbon fibers. These fibers can be used alone or in combination of two or more kinds thereof.

Among these fibers, organic fibers are widely used, and a cellulose fiber such as cotton and rayon, a polyester fiber (PET fiber, etc.), a polyamide fiber (an aliphatic polyamide fiber such as a polyamide 66 fiber, an aramid fiber, etc.), or a polybenzoxazole fiber is preferable.

The thickness of the cover fabric is not particularly limited, and may be, for example, from 0.3 to 1.5 mm, and preferably from 0.5 to 1.2 mm.

In order to enhance the adhesiveness between the belt main body (tooth portion 2 and back portion 4) and the cover fabric, an adhesion treatment may be performed on the cover fabric. The method of the adhesion treatment may be, for example, a method in which a woven fabric is immersed in a resorcin-formalin-latex treatment liquid (RFL treatment liquid) and then heated and dried to form a uniform adhesive layer on the surface of the woven fabric. Furthermore, the method of the adhesion treatment may be a method in which a pretreatment with an epoxy compound or an isocyanate compound is performed and then a treatment with the RFL treatment liquid is performed, or a method in which a rubber composition is dissolved in an organic solvent such as methyl ethyl ketone, toluene, or xylene so as to form a rubber paste, and the woven fabric is treated by being immersed in the rubber paste to impregnate and adhere the rubber composition. These methods can be performed alone or in combination, and the order of treatments and the number of treatments are not limited.

[Method of Manufacturing Power Transmission Belt]

The power transmission belt of the present invention can be manufactured by a conventional method. For example, the toothed belt 1 illustrated in FIG. 1 can be manufactured by the following method. First, a canvas to form the cover fabric 5 is wound around a cylindrical mold having a plurality of concave stripes corresponding to the tooth portion 2 of the toothed belt 1. Subsequently, a cord to be constitute the tension member 3 is wound spirally at a predetermined pitch (a predetermined pitch with respect to the axial direction of the cylindrical mold) in the cylindrical mold with the canvas wound thereon. Next, an unvulcanized rubber sheet to form the back portion 4 and tooth portion 2 is wound to form an unvulcanized sleeve (unvulcanized laminated body). Furthermore, the cylindrical mold on which the unvulcanized sleeve is wound is transferred into a vulcanizing can, and heated and pressed to press-fit the rubber sheet into mold grooves (concave stripes) so as to form the tooth portions 2 with the vulcanization. Finally, the obtained sleeve-form molded body is cut with a cutting blade in accordance with a predetermined cut width, to thereby manufacture individual toothed belts 1.

In addition, the toothed belt 1 may be manufactured by a preliminary molding method by the following procedure. First, the cover fabric 5 and the tooth portion 2 are preliminarily molded with a mold having a tooth mold so as to obtain a preform. Next, the obtained preform is wound around a metal mold, and the tension member 3 is spirally wound thereon. An unvulcanized rubber to constitute the back portion 4 is wound thereon and then, the whole is vulcanized with a vulcanizing can so as to obtain the toothed belt 1. In this preliminary molding method, since the cover fabric 5 and tooth portion 2 are molded in advance before vulcanization, it is not necessary to cause the unvulcanized rubber constituting the back portion 4 to flow into the inside (the ventral side, i.e., the tooth portion 2 side) through between the tension members 3 at the time of the vulcanization to extend the cover fabric 5 to form the tooth portion 2. Therefore, it is possible to reduce the distance between the cords (pitch).

EXAMPLES

Hereinafter, the present invention will be described in more detail based on Examples, but the present invention is not limited by these Examples. In the following examples, raw materials used in Examples, and a measuring method or evaluating method for each physical property are described below. Unless otherwise specified, "parts" and "%" are on a mass basis.

[Raw Material]

EPDM: "EPT4021" manufactured by Mitsui Chemicals, Inc., ethylene content of 51% by mass, diene content of 8.1% by mass Carbon black: "SEAST V" manufactured by Tokai Carbon Co., Ltd.

Silica: "ULTRASIL VN3" manufactured by Evonik Degussa Japan Co., Ltd., BET specific surface area of 175 $m^2/g$ Softener (paraffin oil): "DIANA PROCESS OIL PW 90" manufactured by Idemitsu Kosan Co., Ltd.

Anti-aging agent: "NONFLEX OD3" manufactured by Seiko Chemical Co., Ltd.

Zinc oxide: "second grade zinc oxide" manufactured by Sakai Chemical Industry Co., Ltd.

Stearic acid: "STEARIC ACID CAMELLIA" manufactured by NOF CORPORATION

Hexamethoxymethyl melamine (HMMM): "PP-1890S" manufactured by Power Plast

Benzoguanamine: manufactured by Nippon Shokubai Co., Ltd.

Resorcinol resin: "PHENACOL ITE RESIN (B-18-S)" manufactured by INDSPEC Chemical Corporation Vulcanization accelerator A: "SANCELER TT" manufactured by Sanshin Chemical Industry Co., Ltd Vulcanization accelerator B: "NOCCELER CZ" manufactured by Ouchi Shinko Chemical Industrial Co., Ltd.

Vulcanization accelerator C: "NOCCELER DM-P" manufactured by Ouchi Shinko Chemical Industrial Co., Ltd.

Sulfur: manufactured by Bigen Chemical Co., Ltd.

Organic peroxide: "P-40 MB(K)" manufactured by NOF Co., Ltd.

Glass cord: structure 3/0 of K glass (filament diameter of 6 μm)

Canvas (reinforcement canvas): structure 2/2 of twill weave of polyamide canvas (thickness of 0.70 mm)

[Hardness and 50% tensile stress]

The physical properties of the crosslinked rubber obtained by press-crosslinking the rubber composition shown in Table 1A and Table 1B at 165° C. for 30 minutes were evaluated. The hardness (JIS-A) of the obtained crosslinked rubber was measured according to JIS K 6253 (2012) and the tensile stress M50 at 50% elongation was measured according to JIS K 6251 (2010).

[Cord peeling force]

A plurality of glass cords parallel to each other were placed so as to have a width of 25 mm (fiber interval of 0.1 mm) on an unvulcanized rubber sheet (thickness of 4 mm) formed of the rubber composition shown in Table 1A and Table 1B, a pressure of 2.0 MPa was applied to the sheet with a pressing plate, and the sheet was vulcanized at 160° C. for 30 minutes so as to prepare a strip sample (25 mm in width×150 mm in length×4 mm in thickness) for peeling test. Then, in accordance with JIS K 6256 (2013), the peeling test was conducted at a pulling rate of 50 mm/min, and the adhesive force (vulcanizing adhesive force) between the cord and the adhesion rubber was measured.

[Canvas peeling force]

An unvulcanized rubber sheet (15 cm in length, 3 cm in width, and 4 mm in thickness) formed of the rubber composition shown in Table 1A and Table 1B and canvas (15 cm in length and 3 cm in width) were laminated, a reinforcement canvas was placed on the opposite side to the canvas to interpose unvulcanized rubber sheet, and then vulcanization was performed in this state. The vulcanization condition was 165° C. for 30 minutes. At this time, before laminating, the canvas and the unvulcanized rubber sheet were separated by 2.5 cm in length from an end in the longitudinal direction by using a masking tape in advance. After performing the vulcanization, the ends separated by the masking tape (an end of canvas and an end of rubber sheet with reinforcement canvas) were clamped by upper and lower chucks of an autograph and peeled at a pulling rate of 50 mm/min. The maximum value of the peeling force (N/25 mm) at this time was defined as a canvas peeling force.

[Belt travelling durability]

A canvas was wound around a toothed mold for manufacturing a belt and then the glass cord subjected to an adhesion treatment was spirally wound thereon with a predetermined tension at a predetermined pitch. On the cord, an unvulcanized rubber sheet formed of the rubber composition shown in Table 1A and Table 1B was pasted and then, the whole was put into a vulcanizing can and press-vulcanized at 165° C. for 30 minutes by a conventional press-fitting method. Then, the back surface of the belt was ground to a certain thickness and cut into a certain width so as to obtain a toothed belt. The design of this toothed belt was a tooth type: S2M, a tooth pitch: 2 mm, a number of teeth: 170, and a belt width: 25 mm. For the obtained toothed belt, a traveling test was conducted at an ambient temperature of 100° C. according to the layout illustrated in FIG. 2, and the presence or absence of tooth chipping and canvas peeling was evaluated. In the case where the cord peeling force is low, the tooth of the belt peels off from the cord, thereby causing a defect of the tooth chipping. The traveling time was terminated at the maximum of 400 hours.

Examples 1 to 10 and Comparative Examples 1 to 6

Samples were prepared by using the rubber compositions shown in Table 1A and Table 1B, and hardness, 50% tensile stress, cord peeling force, canvas peeling force, and belt traveling durability were evaluated, and the results are shown in Table 1A and Table 1B.

TABLE 1A

| | | Example | | | | | | | | | |
|---|---|---|---|---|---|---|---|---|---|---|---|
| | | 1 | 2 | 3 | 4 | 5 | 6 | 7 | 8 | 9 | 10 |
| Rubber composition (part by mass) | Rubber (EPDM) | 100 | 100 | 100 | 100 | 100 | 100 | 100 | 100 | 100 | 100 |
| | Carbon black | 60 | 60 | 60 | 50 | 30 | 60 | 60 | 20 | 60 | 60 |
| | Silica | 10 | 10 | 20 | 30 | 40 | 20 | 5 | 50 | 10 | 10 |
| | Softener | 4 | 4 | 4 | 4 | 4 | 4 | 4 | 4 | 4 | 4 |
| | Anti-aging agent | 4 | 4 | 4 | 4 | 4 | 4 | 4 | 4 | 4 | 4 |
| | Zinc oxide | 5 | 5 | 5 | 5 | 5 | 5 | 5 | 5 | 5 | 5 |
| | Stearic acid | 1 | 1 | 1 | 1 | 1 | 1 | 1 | 1 | 1 | 1 |
| | Hexamethoxymethyl melamine (HMMM) | 2 | 5 | 5 | 5 | 5 | 1 | 3 | 5 | 5 | — |
| | Benzoguanamine | — | — | — | — | — | — | — | — | — | 5 |
| | Resorcinol resin | — | — | — | — | — | — | — | — | 2 | — |
| | Vulcanization accelerator A | 1 | 1 | 1 | 1 | 1 | 1 | 1 | 1 | 1 | 1 |
| | Vulcanization accelerator B | 0.5 | 0.5 | 0.5 | 0.5 | 0.5 | 0.5 | 0.5 | 0.5 | 0.5 | 0.5 |
| | Vulcanization accelerator C | 0.5 | 0.5 | 0.5 | 0.5 | 0.5 | 0.5 | 0.5 | 0.5 | 0.5 | 0.5 |
| | Sulfur | 1 | 1 | 1 | 1 | 1 | 1 | 1 | 1 | 1 | 1 |
| | Organic peroxide | — | — | — | — | — | — | — | — | — | — |
| Amino resin/Silica (% by mass) | | 20.0 | 50.0 | 25.0 | 16.7 | 12.5 | 5.0 | 60.0 | 10.0 | 50.0 | 50.0 |
| Hardness (JIS-A) | | 81 | 82 | 85 | 86 | 85 | 83 | 79 | 86 | 82 | 81 |
| 50% tensile stress (MPa) | | 3.0 | 3.1 | 4.5 | 4.7 | 4.2 | 3.2 | 2.7 | 4.4 | 3.2 | 3.0 |
| Cord peeling force (N/25 mm) | 25° C. | 330 | 350 | 380 | 391 | 379 | 301 | 295 | 381 | 285 | 340 |
| | 100° C. | 74 | 83 | 85 | 90 | 75 | 60 | 57 | 80 | 47 | 72 |
| Canvas peeling force (N/25 mm) | 25° C. | 125 | 152 | 145 | 130 | 121 | 95 | 150 | 105 | 66 | 148 |
| | 100° C. | 45 | 61 | 55 | 45 | 37 | 40 | 62 | 35 | 31 | 56 |
| Belt travelling durability (100° C.) | Travelling time (hrs) | 400 | 400 | 400 | 400 | 400 | 350 | 300 | 300 | 300 | 350 |
| | Tooth chipping | Absence | Absence | Absence | Absence | Absence | Presence | Presence | Absence | Presence | Presence |
| | Canvas peeling | Absence | Absence | Absence | Absence | Absence | Absence | Absence | Presence | Absence | Absence |

TABLE 1B

| | | Comparative Example | | | | | |
|---|---|---|---|---|---|---|---|
| | | 1 | 2 | 3 | 4 | 5 | 6 |
| Rubber composition (part by mass) | Rubber (EPDM) | 100 | 100 | 100 | 100 | 100 | 100 |
| | Carbon black | 60 | 70 | 70 | 60 | 60 | 60 |
| | Silica | 10 | — | — | 10 | 10 | 10 |
| | Softener | 4 | 4 | 4 | 4 | 4 | 4 |
| | Anti-aging agent | 4 | 4 | 4 | 4 | 4 | 4 |
| | Zinc oxide | 5 | 5 | 5 | 5 | 5 | 5 |
| | Stearic acid | 1 | 1 | 1 | 1 | 1 | 1 |
| | Hexamethoxymethyl melamine (HMMM) | — | — | 5 | 5 | — | 5 |
| | Benzoguanamine | — | — | — | — | — | — |
| | Resorcinol resin | — | — | — | — | 2 | 2 |
| | Vulcanization accelerator A | 1 | 1 | 1 | — | 1 | — |
| | Vulcanization accelerator B | 0.5 | 0.5 | 0.5 | — | 0.5 | — |
| | Vulcanization accelerator C | 0.5 | 0.5 | 0.5 | — | 0.5 | — |
| | Sulfur | 1 | 1 | 1 | — | 1 | — |
| | Organic peroxide | — | — | — | 5 | — | 5 |
| Amino resin/Silica (% by mass) | | 0.0 | — | — | 50.0 | 0.0 | 50.0 |
| Hardness (JIS-A) | | 79 | 78 | 80 | 71 | 79 | 72 |
| 50% tensile stress (MPa) | | 2.8 | 2.5 | 2.7 | 2.1 | 2.7 | 2.0 |
| Cord peeling force (N/25 mm) | 25° C. | 315 | 232 | 255 | 50 | 280 | 40 |
| | 100° C. | 45 | 40 | 43 | 30 | 30 | 30 |
| Canvas peeling force (N/25 mm) | 25° C. | 92 | 160 | 180 | 20 | 72 | 20 |
| | 100° C. | 31 | 52 | 65 | 5 | 21 | 10 |
| Belt travelling durability (100° C.) | Travelling time (hrs) | 250 | 200 | 250 | 10 | 200 | 10 |
| | Tooth chipping | Presence | Presence | Presence | Presence | Presence | Presence |
| | Canvas peeling | Absence | Absence | Absence | Absence | Absence | Absence |

From the results in Table 1A, it is possible to determine that the power transmission belts of Examples 1 to 10 achieve traveling time of 300 hours or longer and have practically sufficient durability.

Example 6, which was in the condition where the weight ratio of melamine resin to silica was as low as 5% by mass, experienced a defect of tooth chipping at traveling time of 350 hours.

Example 7, which was in the condition where the weight ratio of melamine resin to silica was as high as 60% by mass, experienced a defect of tooth chipping at traveling time of 300 hours.

Example 8, which was in the condition where the blending amount of silica was as large as 50 parts by mass and the blending amount of carbon black was as small as 20 parts by mass, experienced a cover fabric peeling defect in 300 hours.

Example 9, which was in the condition where a resorcinol resin was added, experienced a defect of tooth chipping in 300 hours. On the other hand, Example 2 in which the resorcinol resin was not added, travelled for 400 hours without occurrence of a defect in the belt. Therefore, it is possible to determine that addition of the resorcinol resin does not contribute to the enhancement of the durability.

Example 10, which was in the condition where a guanamine resin is contained as an amino resin, showed an increase in hardness and tensile stress as compared with Comparative Example 1. The core peeling force and canvas peeling force were also increased similar to the case of containing melamine resin, but the peeling force at 100° C. tended to be somewhat lower. That is, the durability under high temperature was slightly better in the melamine resin than in the guanamine resin.

From the above results, it is possible to determine that Examples 1 to 5 have particularly excellent in the durability without defects such as the tooth chipping and the peeling of cover fabric in the belt even after traveling for 400 hours.

On the other hand, in Comparative Examples 1 to 6, the tooth chipping occurred in less than 300 hours of traveling, and sufficient durability was not observed.

Specifically, Comparative Examples 1 to 3, which were in conditions where melamine resin and/or silica was not added, experienced a defect of tooth chipping in 200 to 250 hours of traveling.

Comparative Examples 4 and 6, which were in conditions where crosslinking by an organic peroxide was performed, experienced a defect of tooth chipping in 10 hours of traveling.

Comparative Example 5, which was in the condition where a melamine resin was not added but a resorcinol resin was added, experienced a defect of tooth chipping in 200 hours of traveling.

While the present invention has been described in detail and with reference to specific embodiments, it will be apparent to those skilled in the art that various changes and modifications can be made without departing from the spirit and scope of the present invention.

The present application is based on Japanese Patent Application No. 2016-102618 filed on May 23, 2016 and Japanese Patent Application No. 2017-096586 filed on May 15, 2017, and the contents thereof are incorporated herein by reference.

INDUSTRIAL APPLICABILITY

The power transmission belt of the present invention can be used for various power transmission belts (frictional power transmission belts, meshing power transmission belts, etc.) having a fiber member in contact with a rubber layer, and can be effectively used particularly for a meshing power transmission belt (toothed belt). In addition, the toothed power transmission belt can be combined with a toothed pulley in various fields where synchronization between input and output is required, for example, power transmission of engines such as automobiles and motorcycles, power transmission of motors and pumps, automatic doors, machineries such as automatic doors and automation machines, copying machines, printing machines, and the like. Particularly, the power transmission belt can be used as peripheral equipment (peripheral parts) such as a power transmission belt (timing belt and cogged belt) of automobile engine.

REFERENCE SIGNS LIST

1 . . . TOOTHED BELT
2 . . . TOOTH PORTION
3 . . . TENSION MEMBER
4 . . . BACK PORTION
5 . . . COVER FABRIC (TOOTH FABRIC)

The invention claimed is:

1. A toothed belt comprising:
a belt main body comprising a plurality of tooth portions arranged at predetermined intervals along a belt longitudinal direction, and a back portion in which a tension member is buried; and
a cover fabric covering surfaces of the plurality of tooth portions,
wherein the belt main body is formed of a vulcanizate of a rubber composition comprising:
a rubber component comprising an ethylene-α-olefin elastomer,
a filler comprising a silica,
a vulcanizing agent comprising a sulfur-containing vulcanizing agent, and
16.7 to 50 parts by mass of a curable resin comprising an amino resin with respect to 100 parts by mass of silica.

2. The toothed belt according to claim 1, wherein the amino resin comprises a melamine resin.

3. The toothed belt according to claim 1, wherein the filler further comprises a carbon black.

4. The toothed belt according to claim 3, wherein the ratio of the silica is from 10 to 150 parts by mass with respect to 100 parts by mass of carbon black.

5. The toothed belt according to claim 3, wherein the silica is contained in an amount of from 5 to 30 parts by mass and the carbon black is contained in an amount of from 10 to 100 parts by mass, with respect to 100 parts by mass of the rubber component.

6. The toothed belt according to claim 1, wherein the sulfur-containing vulcanizing agent is selected from the group consisting of powdered sulfur, precipitated sulfur, colloidal sulfur, insoluble sulfur, highly dispersible sulfur, and combinations thereof.

7. The toothed belt according to claim 1, wherein the curable resin comprises substantially no resorcinol resin.

8. The toothed belt according to claim 1, wherein the vulcanizing agent comprises substantially no organic peroxide.

9. The toothed belt according to claim 1, wherein the tension member comprises an inorganic fiber.

10. The toothed belt according to claim 1, wherein the sulfur-containing vulcanizing agent comprises powdered sulfur.

\* \* \* \* \*